(12) United States Patent
Tomura et al.

(10) Patent No.: US 7,121,975 B2
(45) Date of Patent: Oct. 17, 2006

(54) TORQUE TRANSMISSION DEVICE AND METHOD OF REDUCING EFFECTS OF TORQUE PULSATIONS

(75) Inventors: Syuji Tomura, Nagoya (JP); Yoshiaki Ito, Ama-gun (JP); Eiji Sato, Nishikamo-gun (JP); Shoichi Sasaki, Okazaki (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 34 days.

(21) Appl. No.: 10/700,771

(22) Filed: Nov. 5, 2003

(65) Prior Publication Data

US 2004/0142790 A1    Jul. 22, 2004

(30) Foreign Application Priority Data

Jan. 16, 2003    (JP)    ............................. 2003-008123

(51) Int. Cl.
 *B60K 5/08*    (2006.01)
 *H02P 1/00*    (2006.01)
 *H02P 3/00*    (2006.01)
 *G05B 5/01*    (2006.01)

(52) U.S. Cl. .............................. 477/2; 477/7; 180/65.2; 290/40 R; 318/611

(58) Field of Classification Search .................... 477/2, 477/7; 180/65.2; 290/40 R, 51; 318/434, 318/611
See application file for complete search history.

(56) References Cited

U.S. PATENT DOCUMENTS

| 5,020,491 | A |  | 6/1991 | Mashino |  |
|---|---|---|---|---|---|
| 5,722,359 | A |  | 3/1998 | Chubachi et al. |  |
| 5,934,395 | A |  | 8/1999 | Koide et al. |  |
| 6,291,902 | B1 |  | 9/2001 | Ogane et al. |  |
| 6,336,070 | B1 |  | 1/2002 | Lorenz et al. |  |
| 6,365,983 | B1 |  | 4/2002 | Masberg et al. |  |
| 6,621,244 | B1 | * | 9/2003 | Kiyomiya et al. | .......... 318/611 |
| 6,672,415 | B1 | * | 1/2004 | Tabata | ....................... 180/65.2 |
| 6,739,299 | B1 | * | 5/2004 | Suzuki | ..................... 123/179.3 |
| 6,756,758 | B1 | * | 6/2004 | Karikomi et al. | .......... 318/434 |
| 6,840,341 | B1 | * | 1/2005 | Fujikawa | ................... 180/65.2 |
| 6,859,693 | B1 | * | 2/2005 | Tamagawa et al. | ........... 701/22 |

FOREIGN PATENT DOCUMENTS

| DE | 199 58 403 A1 | 6/2001 |
|---|---|---|
| EP | 0 839 683 A2 | 5/1998 |
| JP | 2-146977 | 6/1990 |

(Continued)

OTHER PUBLICATIONS

Michael Beuschel, et al., "Adaptive Damping of Torque Pulsation Using a Starter Generator-Opportunities and Boundaries", Industry Applications Conference, vol. 3, XP-002373773, Oct. 8, 2000, pp. 1403-1408.

*Primary Examiner*—Tisha Lewis
(74) *Attorney, Agent, or Firm*—Oblon, Spivak, McClelland, Maier & Neustadt, P.C.

(57) ABSTRACT

Torque pulsations generated in the torque of an engine are obtained from detection signals from a crankshaft angle detection sensor and an engine water temperature detection sensor at the time of an engine starting operation. A control unit controls an MG1 via a drive circuit so that a damping torque of the same phase as the torque pulsations is generated, and ensures that the torque pulsations of the engine are not transmitted to a ring gear from a planetary carrier.

12 Claims, 12 Drawing Sheets

FOREIGN PATENT DOCUMENTS

| | | |
|---|---|---|
| JP | 9-170533 | 6/1997 |
| JP | 11-89008 | 3/1999 |
| JP | 11-336581 | 12/1999 |
| JP | 2000032607 A * | 1/2000 |
| JP | 2000-205003 | 7/2000 |
| JP | 2000217209 A * | 8/2000 |
| JP | 2001-136605 | 5/2001 |
| JP | 2002-161754 | 6/2002 |
| JP | A 2002-171607 | 6/2002 |

* cited by examiner

MG1 TORQUE AND ENGINE TORQUE PULSATIONS
/ROTATIONAL FREQUENCY AT TIME OF
ENGINE STARTING

SUPPRESSION OF VIBRATION RESULTING FROM RAPID INCREASE IN TORQUE AFTER ENGINE IGNITION

TORQUE TRANSMISSION DEVICE AND METHOD OF REDUCING EFFECTS OF TORQUE PULSATIONS

CROSS-REFERENCE TO RELATED APPLICATION

This application claims priority under 35 USC 119 from Japanese Patent Application No. 2003-8123, the disclosure of which is incorporated by reference herein.

BACKGROUND OF THE INVENTION

1. Field of the Invention

The present invention relates to a torque transmission device and a method of reducing effects of torque pulsations, and in particular to a torque transmission device that transmits the torque of an internal combustion engine to a drive shaft and a method of reducing, using the torque of a motor generator, the effects, on a drive shaft, of torque pulsations generated in the torque from an internal combustion engine when the torque from the internal combustion engine is transmitted to the drive shaft.

2. Description of the Related Art

Conventionally, a hybrid drive device has been known as a drive device having an internal combustion engine and an electric motor. This kind of hybrid drive device has come to be used as a drive device in vehicles in order to reduce exhaust gas and improve fuel consumption.

The conventional hybrid drive device is equipped with an engine, such as an internal combustion engine, that operates by burning fuel, a spring-type damper device that absorbs the rotational movement of the engine, a planetary gear-type distribution mechanism that mechanically distributes, to a first motor generator and an output member, the output of the engine transmitted via the damper device, and a second motor generator that applies a rotational force to the output member (Japanese Patent Application Laid-Open (JP-A) No. 9-170533).

When the first motor generator is switched to an unloaded state and reversely rotated at the time a vehicle using only the second motor generator as a source of power is traveling, the hybrid drive device can rotatingly drive and start the engine via the distribution mechanism by causing the first motor generator to generate a predetermined braking torque or a predetermined torque in a positive rotational direction. In that case, because part of the output of the second motor generator is consumed by the rotation of the engine, the second motor is operated by an output equal to or greater than the power necessary for travel and the engine is rotatingly driven by the additional power equal to or greater than the necessary power—i.e., by a power in which the necessary power is subtracted from the output of the second motor generator. Thus, fluctuations in drive power resulting from the starting of the engine can be suppressed.

SUMMARY OF THE INVENTION

The present invention was devised in light of the above-described facts, and it is an object thereof to provide a torque transmission device and a method of reducing effects of torque pulsations that can more easily reduce the torque pulsations of an internal combustion engine.

The invention for achieving this object is a torque transmission device comprising: a transmission mechanism where a motor generator and an internal combustion engine are coupled and that acts by a torque of the motor generator so that a torque from the internal combustion engine is transmitted to a drive shaft; a detector that detects torque pulsations generated in the torque from the internal combustion engine before the torque pulsations are transmitted to the drive shaft; and a control unit that controls the motor generator to generate a reducing torque of the same phase as the torque pulsations for reducing effects of the detected torque pulsations on the drive shaft.

That is, the invention is a torque transmission device disposed with a transmission mechanism where a motor generator is coupled and that acts by a torque of the motor generator so that a torque from the internal combustion engine is transmitted to a drive shaft.

Here, torque pulsations from the internal combustion engine are sometimes generated at a starting operation time and a stopping operation time of the internal combustion engine.

The detector of the invention detects torque pulsations generated in the torque from the internal combustion engine before the torque pulsations are transmitted to the drive shaft. The control unit controls the motor generator to generate a reducing torque of the same phase as the torque pulsations for reducing effects of the detected torque pulsations on the drive shaft.

Thus, a torque including the torque pulsations from the internal combustion engine and a reducing torque of the same phase as the torque pulsations for reducing effects of the detected torque pulsations on the drive shaft are supplied to the transmission mechanism. Thus, the torque including the torque pulsations from the internal combustion engine is transmitted to the drive shaft via the transmission mechanism with the torque pulsations being reduced by the reducing torque.

In this manner, because the invention detects torque pulsations generated in the torque from the internal combustion engine before the torque pulsations are transmitted to the drive shaft and causes the motor generator to generate a reducing torque of the same phase as the torque pulsations for reducing effects of the detected torque pulsations on the drive shaft, the torque pulsations of the internal combustion engine can be reduced at the stage before the torque is transmitted to the drive shaft and effects on the drive shaft of the torque pulsations of the internal combustion engine can be easily reduced.

Here, the reducing torque may be a value where the torque pulsations detected by the detector are multiplied by a constant determined from two physical quantities representing rotational properties of the motor generator and the internal combustion engine and a physical quantity representing a transmission property of the transmission mechanism. In this manner, because the reducing torque is made into a value where the torque pulsations are multiplied by the constant, control of the motor generator for generatng the reducing torque can be made simple.

Also, the relative amount of the reducing torque with respect to the torque pulsations may be, outside of a predetermined time period including a time when the effects of the torque pulsations on the drive shaft become largest, made smaller than that during the predetermined time period. In this manner, because the relative amount of the reducing torque with respect to the torque pulsations is, outside of a predetermined time period including a time when the effects of the torque pulsations on the drive shaft become largest, made smaller than that during the predetermined time period—i.e., because the relative amount of the reducing torque with respect to the torque pulsations when it is comparatively unnecessary is made smaller—it is efficient.

The transmission mechanism may include: a first rotating shaft that receives the torque from the internal combustion engine; a second rotating shaft corresponding to the drive shaft; and a third rotating shaft that is coupled to the motor generator and acts by the torque from the motor generator so that the torque received by the first rotating shaft is transmitted to the drive shaft via the second rotating shaft. Also, the torque transmission device may further include a resilient buffer mechanism coupled between the internal combustion engine and the first rotating shaft. That is, in the present invention, as described above, because the torque pulsations of the internal combustion engine are reduced at the stage before the torque is transmitted to the drive shaft, the torque pulsations of the internal combustion engine can be easily reduced even if a resilient buffer mechanism is disposed. Also, a reducer (reduction gears) may be coupled to the drive shaft.

DETAIL DESCRIPTION OF THE INVENTION

A first embodiment of the invention will be described below with reference to the drawings.

Figure 1:
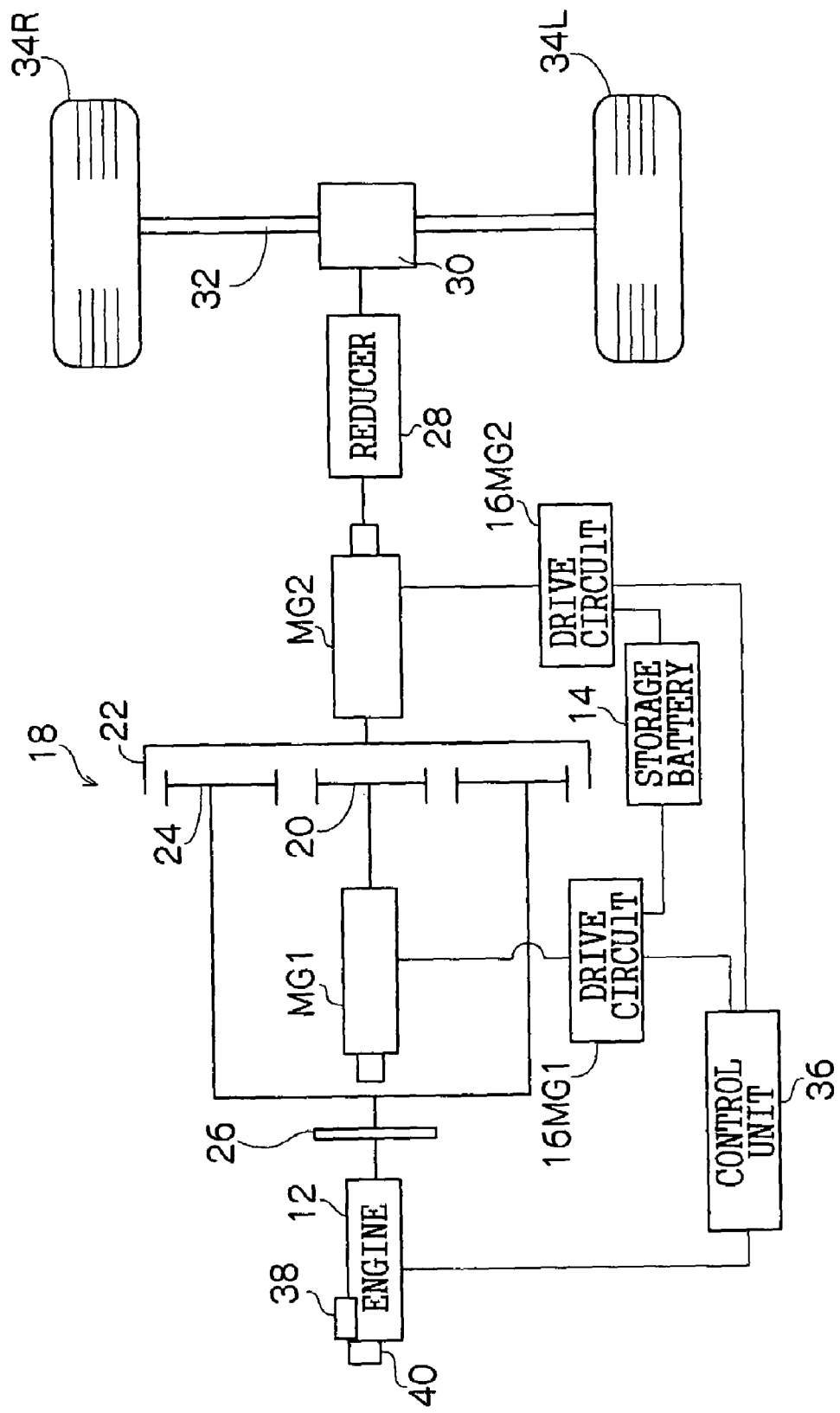
FIG. 1 is a diagram showing the configuration of a torque transmission device pertaining to a first embodiment.

As shown in FIG. 1, a gasoline engine 12 (referred to below as "the engine") serving as an internal combustion engine, a motor generator 1 (referred to below as "the MG1") and a motor generator 2 (referred to below as "the MG2") are disposed in a power system of a hybrid automobile disposed with a torque transmission device of the present embodiment. The MG1 and MG2 are configured as synchronous electric motors and disposed with an unillustrated rotor having plural permanent magnets at an outer circumferential surface and an unillustrated stator around which is wound a three-phase coil forming a rotating magnetic field. The three-phase coils wound around the stators of the MG1 and MG2 are respectively connected to a storage battery 14 via drive circuits 16MG1 and 16MG2. The drive circuits 16MG1 and 16MG2 are unillustrated transistor inverters disposed with one pair of transistors per phase, which transistors serve as switching elements. The MG1 and MG2 can receive supplies of power from the storage battery 14 and operate as electric motors that are rotatingly driven, and can also function as generators and charge the storage battery 14 when the rotors are rotated by an external force.

An engine water temperature detection sensor 38 and a crank angle detection sensor 40 connected to a control unit 36 are attached to the engine 12. The drive circuits 16MG1 and 16MG2 are connected to the control unit 36, which serves as control means, and the MG1 and the MG2 are controlled.

The engine 12, the MG1 and the MG2 are respectively mechanically coupled via a power dividing mechanism 18 that serves as a transmission mechanism. The power dividing mechanism 18 is disposed with a sun gear 20, a ring gear 22 and a planetary gear configured by a planetary carrier 23 having a planetary pinion gears 24 (see FIG. 2). A crankshaft of the engine 12 is coupled to the planetary gear 23 (see FIG. 2) via a resilient buffer mechanism 26 (referred to below as a torsional damper). It should be noted that a rotating shaft of the planetary carrier 23 to which the crankshaft of the engine 12 is coupled corresponds to a first rotating shaft. The rotor of the MG1 is coupled to a rotating shaft (a third rotating shaft) of the sun gear 20. The rotor of the MG2 is coupled to a rotating shaft (a second rotating shaft) of the ring gear 22. The rotation of the ring gear 22 is transmitted to wheels 34R and 34L via a reducer 28, a differential gear 30 and a drive shaft 32.

Figure 3:
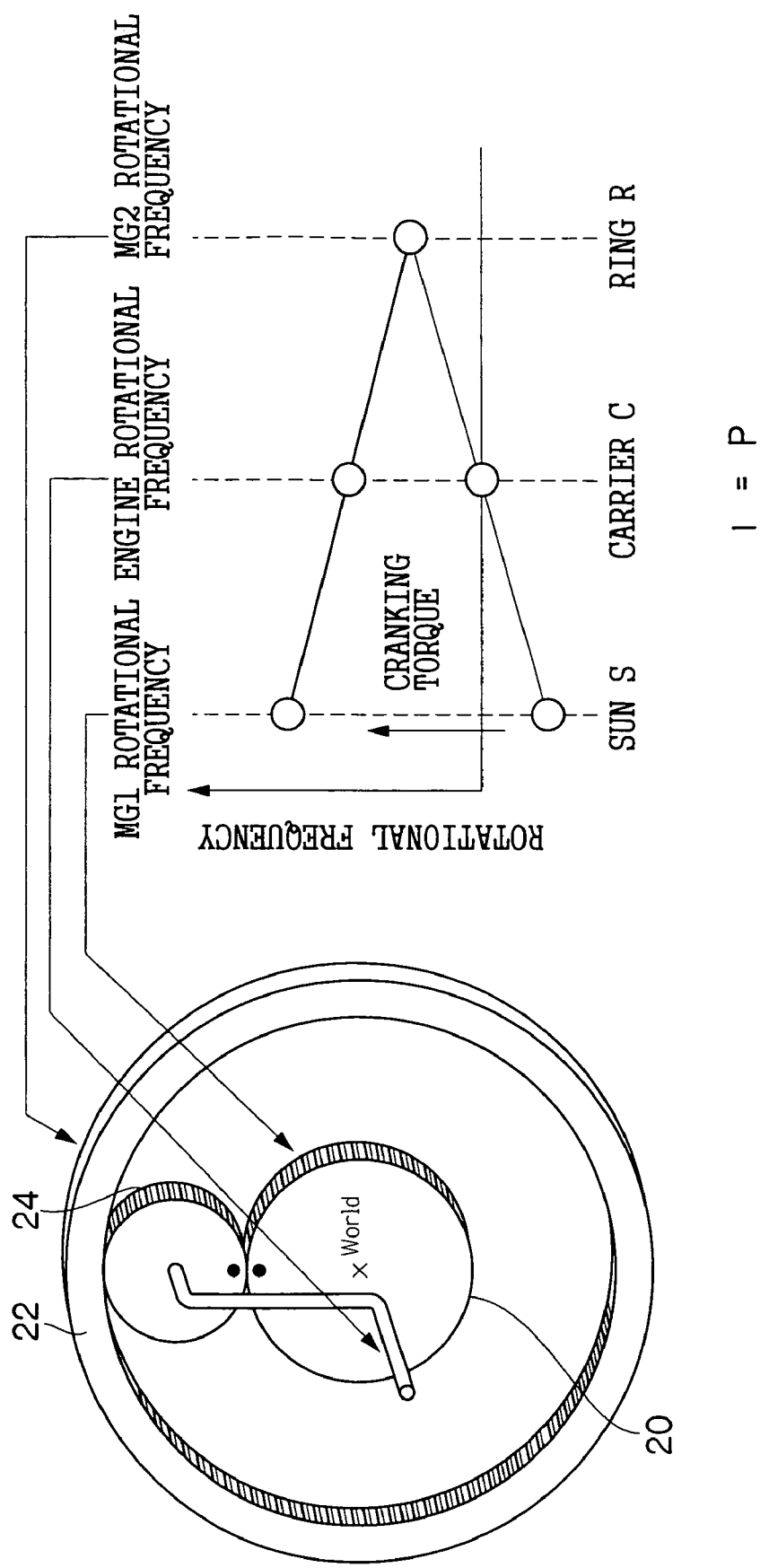
FIG. 3 is a diagram showing the relation between the power dividing mechanism and rotational frequencies of gears.

Here, the operation of the power dividing mechanism 18 when the engine is started will be described. Here, a case will be described where the engine is started while traveling particularly by the motor (MG2). The relation of the torques and rotational frequencies in the three shafts of the planetary gear (the sun gear shaft 20, the ring gear shaft 22 and the carrier shaft 23) can be mechanically expressed as a diagram called a collinear diagram shown in FIG. 3. The vertical axis in FIG. 3 is the rotational frequency axis of the three shafts, and the horizontal axis represents the ratio of the positions of the coordinate axes of the three shafts. That is, when the coordinate axes S and R of the sun gear shaft 20 and the ring gear shaft 22 are taken at both ends, a coordinate axis C of the carrier shaft 23 is determined as an axis where axis S and axis R are internally divided to 1:ρ. Here, ρ is the gear ratio between the sun gear 20 and the ring gear 22. The rotational frequencies of the three shafts of the planetary gear have the characteristic that they are lined up in a straight line on the collinear diagram. This straight line is called an operational collinear. When the vehicle is traveling forward and the ring gear is positively rotating in a state where the engine is stopped (the rotational frequency of the gear is 0), the sun gear 20 rotates in a negative direction. Here, when a positive cranking torque is outputted from the MG1 coupled to the sun gear 20 so that the MG1 is made to rotate in the positive direction, the rotational frequency of the planetary carrier rises in the positive direction and the engine connected to the planetary carrier via the torsional damper is cranked. When the rotational frequency of the engine reaches a combustible rotational frequency, fuel injection and ignition are conducted and the engine starts.

Next, the action of the present embodiment will be described.

Figure 4:
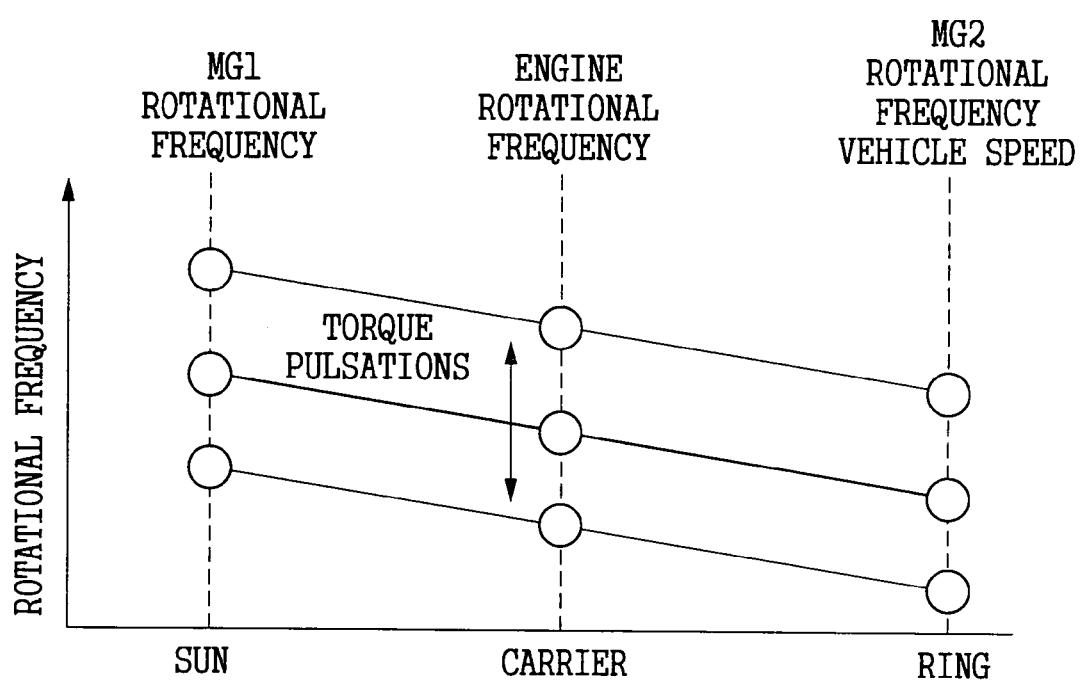
FIG. 4 is a diagram showing the relations of the rotational frequencies of the gears of the power dividing mechanism when torque pulsations are generated.

First, torque pulsations generated in the torque of the engine 12 will be described. At the time of the engine starting operation and the time of the stopping operation, torque pulsations are generated in the crankshaft due to compression and expansion of gas absorbed inside a cylinder. Thus, as shown in FIG. 4, a change in rotational frequency arises in the planetary carrier 23. Thus, the torque pulsations of the engine 12 are transmitted to the drive shaft 32 in accordance with this change in rotational frequency and, as a result, a fluctuation in rotational frequency arises in the ring gear 22. When the torque pulsations are outputted to the drive shaft 32 in this manner, a fluctuation in rotational frequency is generated in the drive shaft 32 and riding comfort is adversely affected.

Figure 2:
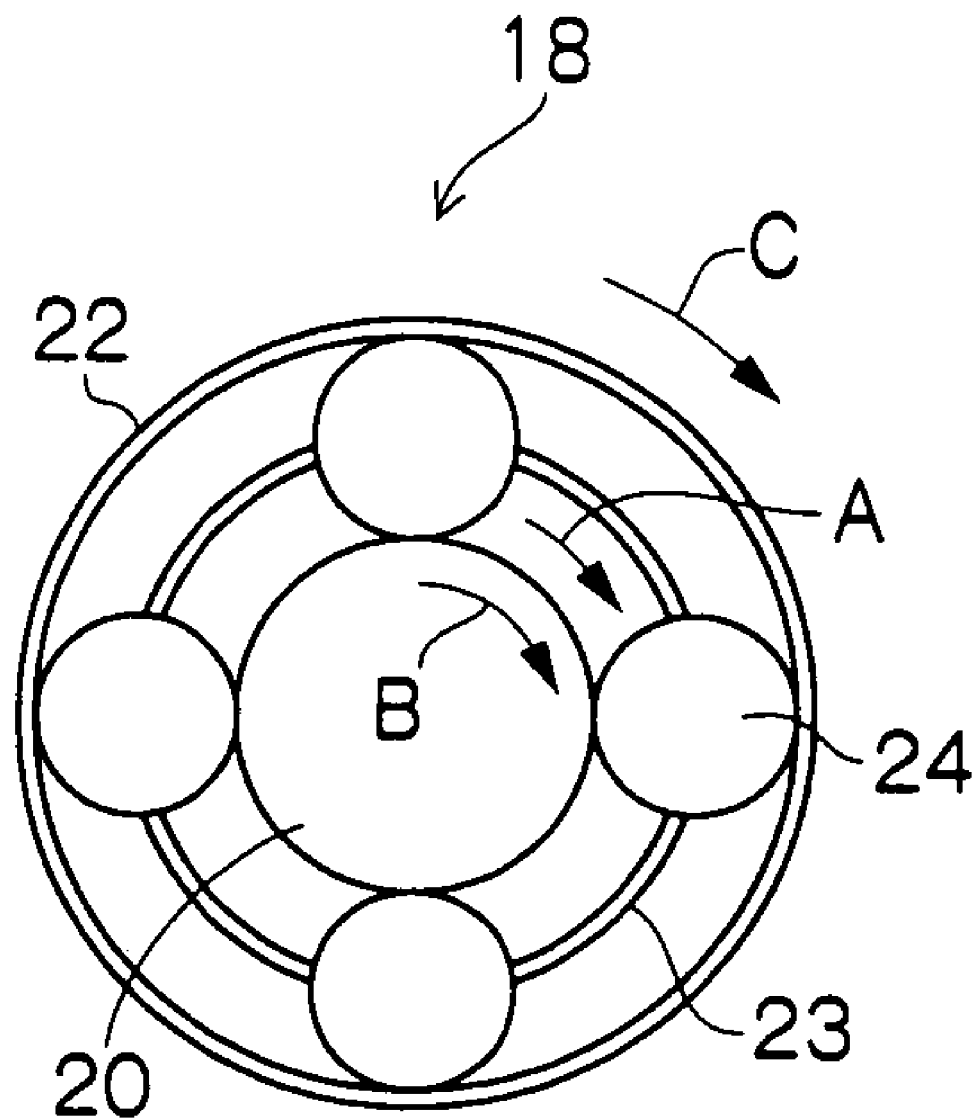
FIG. 2 is a diagram showing a power dividing mechanism.

Thus, in the present embodiment, a vibration reducing torque (referred to below as a damping torque (corresponds to a reducing torque)) of the same phase as the engine torque pulsation generated at the time of the engine starting operation and the stopping operation time is outputted from the MG1 (see reference sign B in FIG. 2) and the MG1 is vibrated in synchronization with the engine 12, whereby the effects of the torque pulsations on the drive shaft (ring gear) are reduced (so that they are preferably not outputted) (see reference sign C in FIG. 2). That is, by confining the effects of the torque pulsations of the engine to the system comprising the engine, torsional damper, planetary carrier, sun gear and MG1, the effects of the torque pulsations of the engine on the ring gear 22 linked to the drive shaft 32 are reduced (so that they are preferably not outputted).

Figure 5:
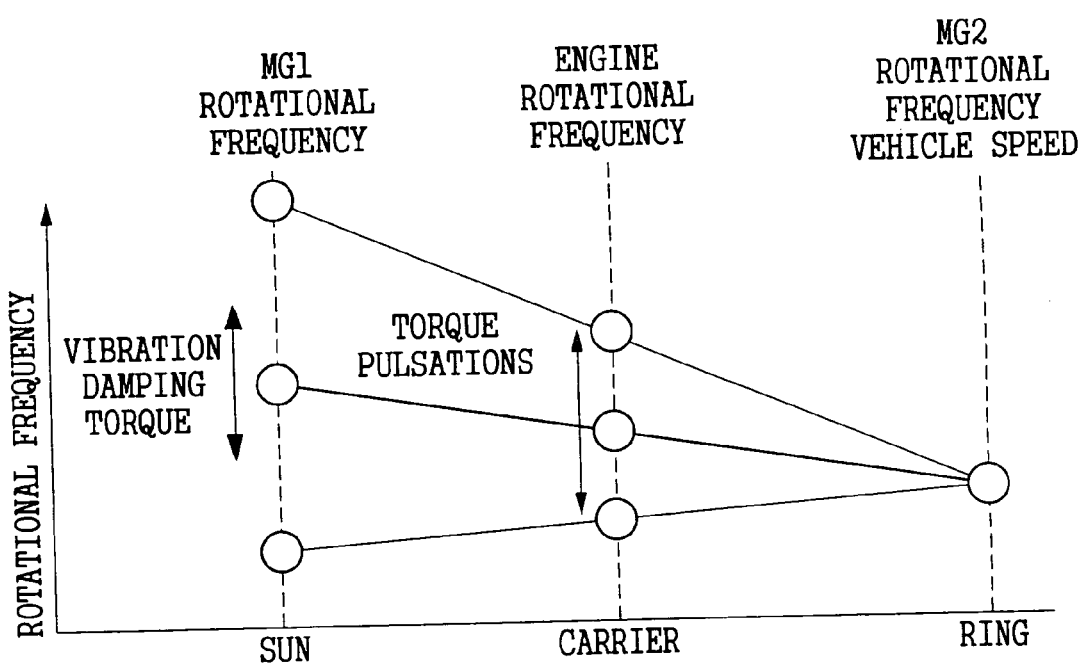
FIG. 5 is a diagram showing the relations of the rotational frequencies of the gears of the power dividing mechanism when an MG1 is made to generate a damping torque pertaining to the present embodiment.

The above action will be described using the collinear diagram of FIG. 5. It will be assumed that the torque pulsations are generated in the engine coupled to the planetary carrier via the torsional damper and that a sign (direction) of the torque pulsation has become positive at a certain moment. Here, in the collinear diagram of FIG. 5, the upper direction in the diagram will be a positive torque. In this case, by similarly adding a torque of a predetermined amount in the positive direction to the MG1 coupled to the sun gear, fluctuation in the rotational frequency of the ring gear can be made 0 or suppressed. Conversely, it will be assumed that the sign of the torque pulsation of the engine has become negative at a certain moment. In this case, because the MG1 coupled to the sun gear adds a torque of a predetermined amount in the negative direction, fluctuation in the rotational frequency of the ring gear can be made 0 or suppressed. That is, because a pulsation torque of the same phase as the torque pulsations of the engine is outputted from the MG1, effects resulting from the engine torque pulsations are confined to a fluctuation in the rotational frequency of the planetary carrier and a fluctuation in the rotational frequency of the sun gear, and effects on the ring gear can be minimized or made 0.

Next, a method of determining the amount of the damping torque will be described. The reason why the amplitude may be changed with the same phase as the engine torque in order to conduct the above-described control will be described below.

In order to reduce the effects of the torque pulsations of the engine 12 on the ring gear 22 (so that they are preferably not outputted), it may be ensured that the sun gear 20 does not receive a reaction force of the planetary carrier 23 resulting from the torque pulsations. In order to ensure that the sun gear 20 does not receive a force from the planetary carrier 23 resulting from the torque pulsations, the MG1 may be controlled so that twisting of the torsional damper 26 does not occur due to the torque pulsations. That is, it will be understood that a torque may be applied to the MG1 so that twisting of the torsional damper does not occur due to the torque pulsations of the engine 12.

Here, characteristics between an engine torque Te, an MG1 torque Tmg1 and an MG2 torque Tmg2, which are inputs to the drive system, and a torsional damper twisting angle $\theta td$ can be expressed by an equation of motion of the drive system as

[Equation 1]

$$\theta td = A(s)Te + B(s)Tmg1 + C(s)Tmg2 \quad (1)$$

(where A(s), B(s) and C(s) are transfer functions). Here, the engine torque Te can be divided into a steady portion Tes and a pulsation portion Tep.

[Equation 2]

$$Te = Tes + Tep \quad (2)$$

In order to eliminate the effects of the engine torque pulsations Tep on $\theta td$, the damping torque of Tmg1 is set so as to satisfy Equation 3.

[Equation 3]

$$Tmg1 = -\frac{A(s)}{B(s)} Tep \equiv K(S) \times Tep \quad (3)$$

In the hybrid vehicle of the example, K(s) is as follows when calculated.

[Equation 4]

$$K(s) = \frac{a_0(s-\alpha_0)(s-\alpha_1)\ldots(s-\alpha_n)}{b_0(s-\beta_0)(s-\beta_1)\ldots(s-\beta_n)} \quad (4)$$

Here, $a_0$ and $b_0$ are real constants, $\alpha_0, \ldots, \alpha_n$ are the zero points of K(s), $\beta_0, \ldots, \beta_n$ are the poles of K(s) and real or complex constants. Here, between $\alpha_0, \ldots, \alpha_n$ and $\beta_0, \ldots, \beta_n$, there is a relation of all pole zero offsets.

[Equation 5]

$$\alpha_0 \approx \beta_0, \alpha_1 \approx \beta_1, \alpha_n \approx \beta_n \quad (5)$$

Thus, K(s) can be approximated with a constant. That is, it becomes

[Equation 6]

$$K(s) \approx \frac{a_0}{b_0} = K \propto \frac{1+\rho}{\rho} \frac{Img1}{Ie} \quad (6)$$

and K is a constant relating to $\rho$, Img1 and Ie. Here, $\rho$ is the gear ratio between the sun gear 20 and the ring gear 22 (physical quantity representing transmission property), Img1 is the rotational inertia of the MG1 rotor (physical quantity representing rotational property), and Ie is the rotational inertia of the engine (physical quantity representing rotational property). From Equation 6, it will be understood that the phase of the damping torque that the MG1 is to output is the same with respect to the engine torque pulsations (i.e., phase operation is unnecessary) and that the amplitude is K times the engine torque pulsation. That is, because the torque pulsations are detected from the crank angle and the engine temperature and that which is made K times (constant times) the torque pulsations is the damping torque, conducting a phase operation is unnecessary.

Next, a method of estimating the engine torque pulsations necessary to calculate the damping torque will be described. At the time of cranking (state where the engine is rotated by another force) and the engine stopping operation, the torque pulsations are generated by a pumping action resulting from compressing and expanding gas sucked inside the cylinder. Because the vehicle of the present example has a four-cylinder engine, torque pulsations of 2 cycles per 1 rotation of the crankshaft are generated. Because these torque pulsations can be regarded as a function of the crank angle as long as the engine water temperature and control input of the intake valve and exhaust valve (open/close angle and lift amount) are constant, in the present invention, the torque pulsations are determined from a map using the crank angle θe and the engine water temperature as variables. This map is created from experimental values or a theoretically derived engine model.

Figure 6:
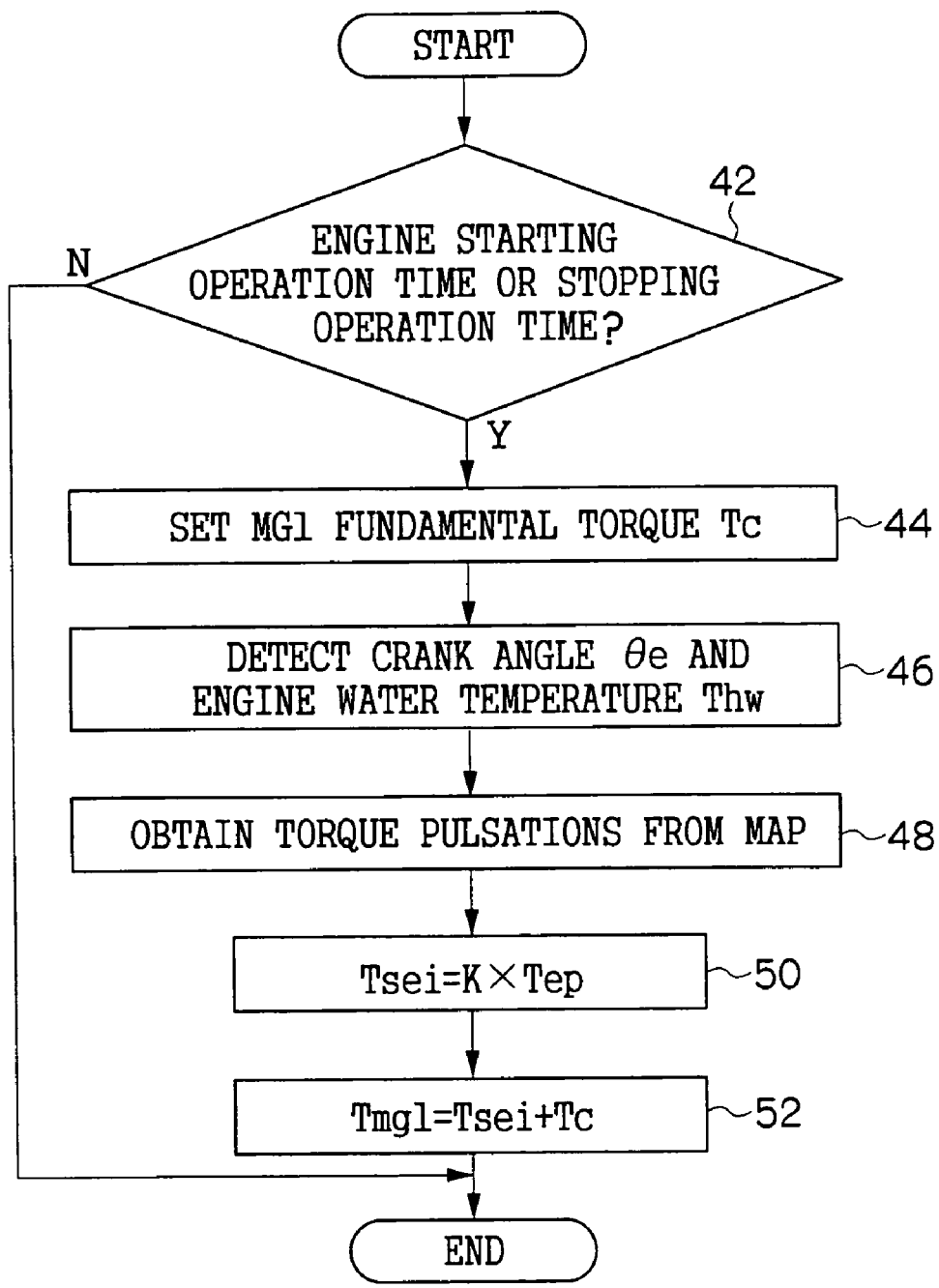
FIG. 6 is a flow chart showing a control routine implemented by a control unit pertaining to the first embodiment.

On the basis of the above principle, a routine conducted by the control unit of the present embodiment will be described with reference to the flow chart of FIG. 6.

In step 42, it is determined whether the time is the engine starting operation time, the stopping operation time or not. When the time is determined to be the engine starting operation time or the stopping operation time, a fundamental torque Tc of the MG1 is set in step 44. The fundamental torque Tc of the MG1 is the torque necessary to rotate the engine to a combustible predetermined rotational frequency at the time of starting the engine and is a torque applied to the engine in order to rapidly make the engine rotational frequency 0 at the time of stopping the engine.

In step 46, the crank angle θe is detected from the crank angle detection sensor 40 and the engine water temperature Thw is detected by the engine water temperature detection sensor 38. In step 48, the torque pulsations Tep are obtained from a data map showing the relation of the crank angle θe, the engine water temperature Thw and the torque pulsations.

In step 50, the torque pulsation Tep is multiplied by the coefficient K to calculate the damping torque Tsei. In step 52, the calculated damping torque Tsei is added to the fundamental torque Tc, and the result is used as an MG1 command value to control the MG1.

By adding the damping torque to the MG1 with the same phase as the engine torque pulsations in this manner, the effects of the engine torque pulsations do not appear in the ring gear linked to the drive shaft, or the effects can be reduced. In this case, although the fluctuation in the rotational frequency of the MG1 and fluctuation in the rotational frequency of the engine are in a direction in which they are amplified, the output of the engine torque pulsations to the drive shaft dominantly acting on vehicle vibration can be suppressed. Thus, vehicle vibration can be reduced.

In the above-described first embodiment, the torque pulsations generated in the torque from the engine are detected before they are transmitted to the drive shaft, and the electric motor is made to generate a damping torque of the same phase as the torque pulsations for reducing the effects, on the drive shaft, of the detected torque pulsations. Thus, the torque pulsations of the engine can be reduced at the stage before the torque is transmitted to the drive shaft and the torque pulsations of the engine can be easily reduced.

Figure 7:
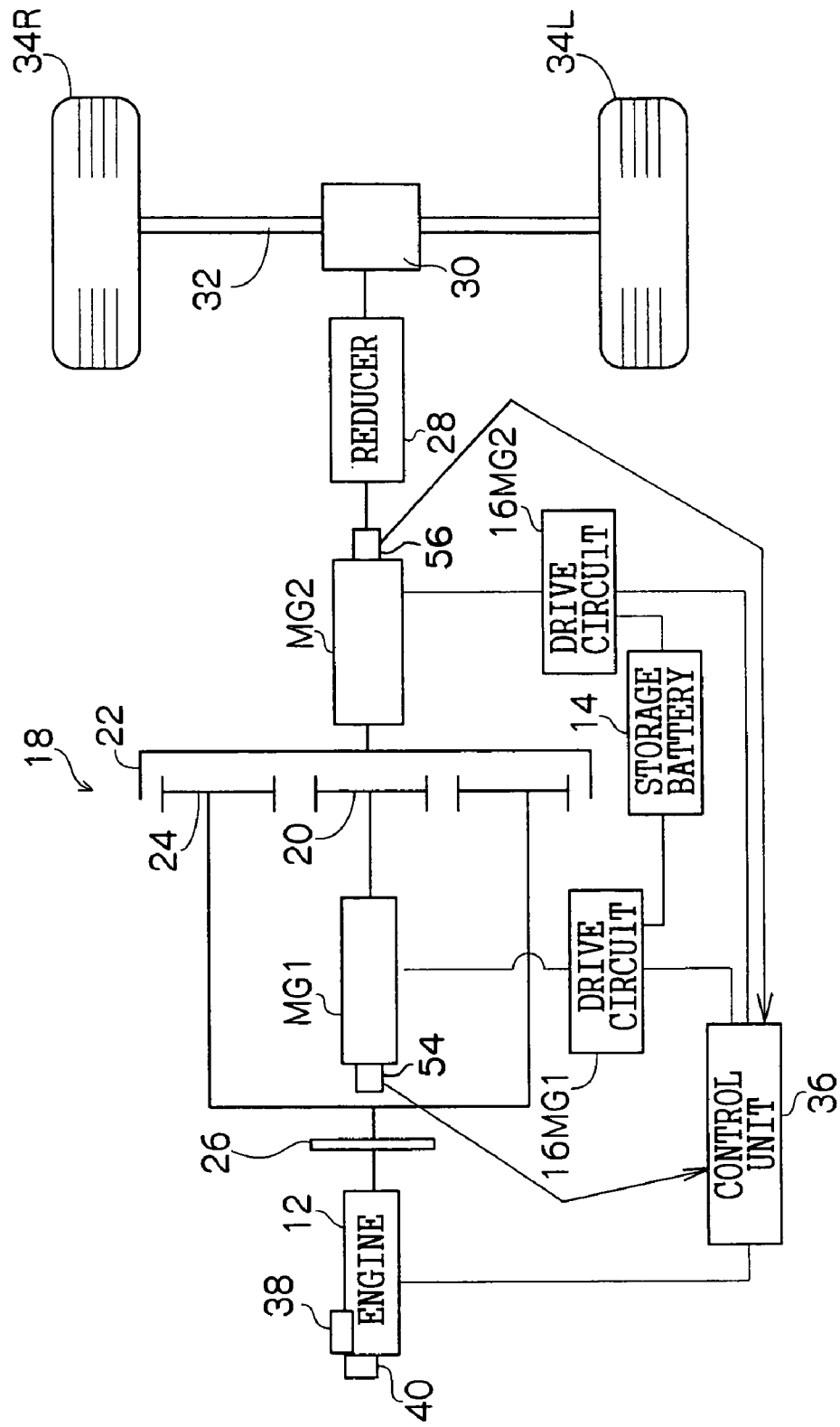
FIG. 7 is a diagram showing the configuration of a torque transmission device pertaining to a second embodiment.

Next, a second embodiment of the invention will be described. Because the configuration of the present embodiment is substantially the same as that of the preceding first embodiment, the same reference numerals will be given to the same parts, description thereof will be omitted, and parts that are different will be described. That is, in the present embodiment, as shown in FIG. 7, the MG1 and MG2 are further disposed with angle sensors 54 and 56 connected to the control unit 36.

Next, the action of the present embodiment will be described.

Although the damping torque resulting from the MG1 may be a torque in which the amplitude of the engine torque pulsations is multiplied by K as described above, it is not preferable to always output the damping torque while the engine is running in view of energy consumption. Also, the time when vehicle vibration resulting from the engine torque pulsations actually becomes a problem is the time when the resonance frequency of the torsional damper in the system comprising the engine, the torsional damper and the MG1 is passed through, and this resonance frequency is ordinarily present in a lower rotational region than the idling rotational frequency of the engine. Thus, the relative amount of the damping torque with respect to the torque pulsations is, outside of a predetermined period of time including the time when the effects on the drive shaft 32 of the torque pulsations become largest, made smaller than a predetermined period of time. For example, it is ensured that the amplitude of the damping torque becomes a maximum at a rotational frequency in the vicinity of the resonance frequency of the torsional damper. Specifically, the coefficient Kf corresponding to the planetary carrier rotational frequency is further multiplied by the value where the engine torque pulsation is multiplied by K, and the final damping torque is calculated. That is, the damping torque can be determined from the following equation.

[Equation 7]

$$Tsei = K \times Kf \times Tep \qquad (7)$$

Figure 8:
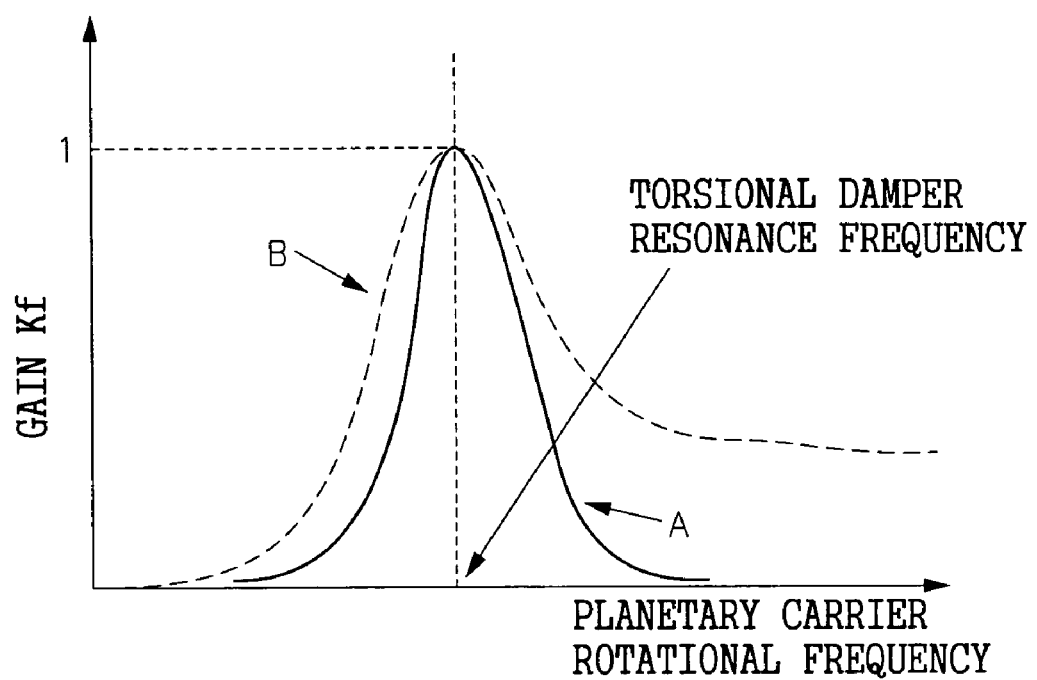
FIG. 8 is a diagram showing the relation between a gain Kf and the rotational frequency of a planetary carrier.

The coefficient Kf is a function that becomes 1 in the vicinity of the planetary carrier rotational frequency that becomes the resonance frequency of the torsional damper, becomes 0 when the rotational frequency of the planetary carrier is 0, and becomes a real number of 0 to 1 at other planetary carrier rotational frequencies, and is experimentally or analytically set. A schematic diagram of Kf is shown in FIG. 8. Kf becomes 1 in the vicinity of the resonance frequency of the torsional damper as shown by the curve A of FIG. 8. A Kf that is smoothly asymptotic to 0 at other rotational frequencies may be used or a Kf that is asymptotic to a constant value that corresponds to a planetary carrier rotational frequency larger than the rotational frequency that is the resonance frequency of the torsional damper as in the curve B may be used. By making Kf into the curve B, vibration resulting from the engine torque pulsations can be suppressed with respect to all engine rotational frequencies. This Kf is stored as a map.

A planetary carrier rotational frequency Wc used to calculate Kf is determined from the following Equation 8 from the MG1 rotational frequency Wmg1 and the MG2 rotational frequency Wmg2.

[Equation 8]

$$Wc = \frac{1}{1+\rho} Wmg2 + \frac{\rho}{1+\rho} Wmg1 \qquad (8)$$

Because the MG1 rotational frequency Wmg1 and the MG2 rotational frequency Wmg2 can be calculated from angle detection signals of the angle sensors 54 and 56 attached to the MG1 and MG2, the rotational frequency of the planetary carrier can be calculated using Equation 8.

Figure 9:
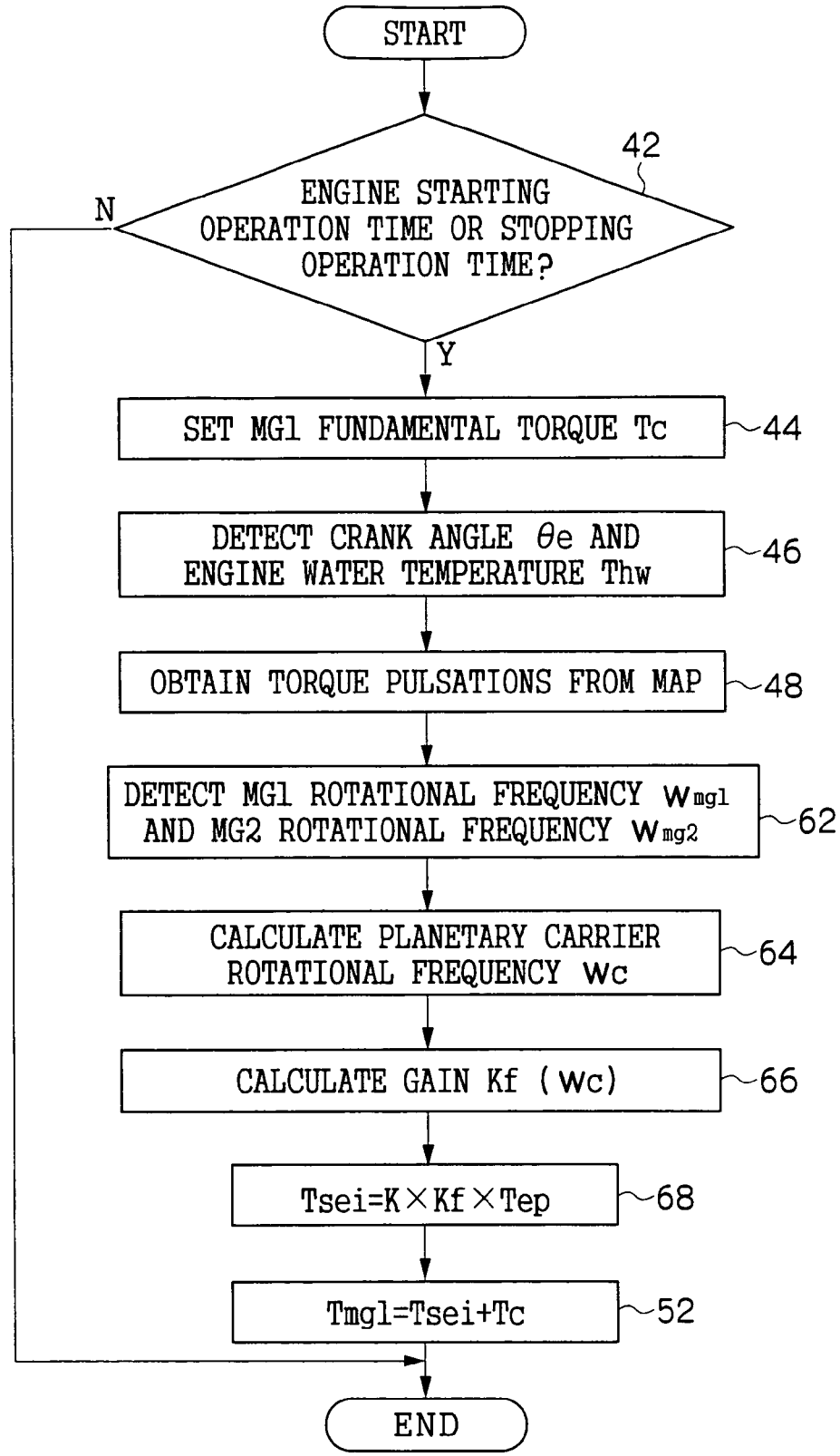
FIG. 9 is a flow chart showing a control routine implemented by a control unit pertaining to the second embodiment.
Figure 10A:
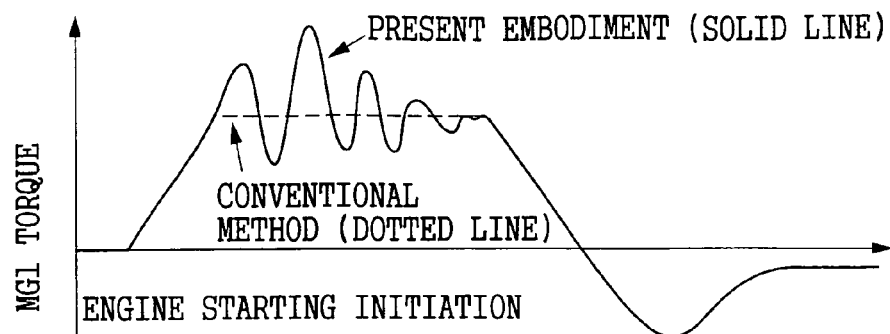
FIGS. 10A to 10D are diagrams showing the relation between an MG1 torque, engine torque pulsations and the rotational frequency of an engine when the engine is started.
Figure 10B:
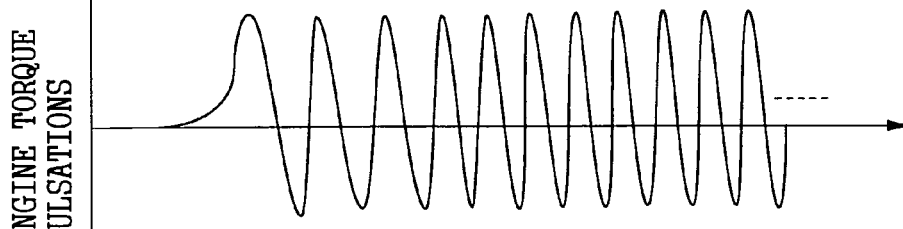
Figure 10C:
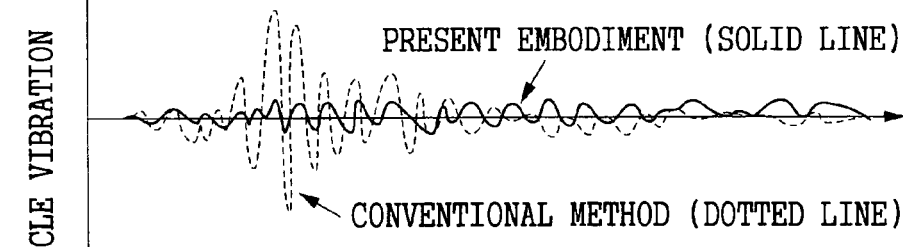
Figure 10D:
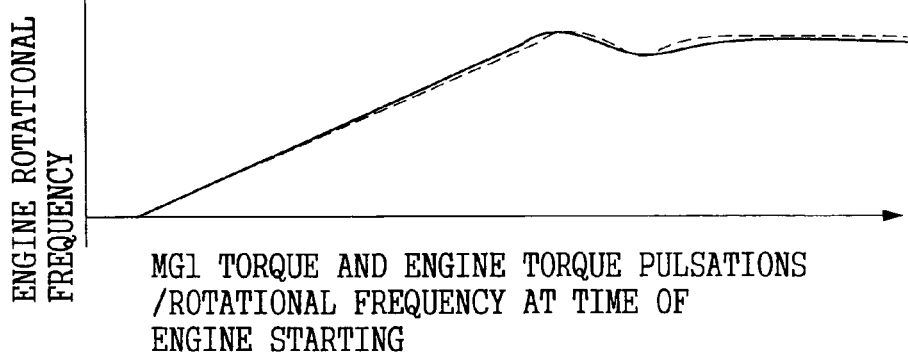

The routine conducted by the control unit of the present embodiment is as shown in FIG. 9. That is, after steps 42 to 48, which were described above in the first embodiment, have been implemented, the rotational frequency Wmg1 of the MG1 and the rotational frequency Wmg2 of the MG2 are detected from the angle detection signals from the angle sensors 54 and 56 in step 62. In step 64, the rotational frequency Wc of the planetary carrier 23 is calculated. In step 66, the gain Kf is calculated using the map from the rotational frequency Wc of the planetary carrier 23 and the damping torque Tsei is determined from Equation 7.

In the present embodiment, although the planetary carrier rotational frequency is calculated using Equation 8 from the rotational frequency Wmg1 of the MG1 and the rotational frequency Wmg2 of the MG2 and used to calculate Kf, a sensor that detects the crankshaft angle may be attached to the engine and used to calculate the crankshaft rotational frequency and calculate Kf.

FIGS. 10A to 10D show the MG1 torque, the engine torque, vehicle vibration and the engine rotational frequency when the present embodiment is implemented at the time of starting the engine. In the conventional method, a trapezoidal torque such as the one represented by the dotted line in FIG. 10A has been outputted from the MG1 at the time of starting the engine, the engine has been cranked, and the rotational frequency of the engine has been made to rise as indicated by the dotted line of FIG. 10D. When cranking is initiated, the engine has generated a torque pulsation such as in FIG. 10B due to the compression and expansion of absorbed gas, and this torque vibration has been transmitted to the drive shaft, whereby vehicle vibration such as shown by the dotted line in FIG. 10C has been generated. In contrast, in the present embodiment, a torque where a damping torque of the same phase as the engine torque pulsation is added to the MG1 torque command value at the time of ordinary engine starting is outputted from the MG1 as shown by the solid line of FIG. 10A, whereby vehicle vibration can be suppressed as shown by the solid line in FIG. 10C. The damping torque becomes a torque where the estimated engine torque pulsation is multiplied by the constant gain K and Kf, which is a function of the planetary carrier rotational frequency substantially equal to the engine rotational frequency, and is added to the MG1 torque only at the time of engine cranking. It will be understood that there is virtually no change in the rate of increase of the engine rotational frequency even when the damping torque is applied as shown by the solid line of FIG. 10D, and the effect on engine starting speed is small.

In the present embodiment, although the value of coefficient Kf is set to become 1 in the vicinity of the resonance frequency of the torsional damper, the maximum value of Kf may also be set to a value of 1 or less. When the value is set in this manner, the damping effect becomes smaller than when the value is set to 1, but the vehicle vibration damping effect is nevertheless sustained.

In the above-described first and second embodiments, the value of the engine torque pulsations at the time of starting and the time of stopping calculated and determined in advance offline is retained as a map and the engine torque pulsations are read using the above engine information. However, in place of retaining the map, it may also be determined in real time using a model of the engine torque that is a function of the crankshaft angle θe, the engine rotational frequency, the throttle opening, the engine water temperature, and the open/close angle of the intake and exhaust valves, and the like.

Also, in place of the angle detection device of the crankshaft and the engine torque estimation device, a torque sensor may be added to the crankshaft and the engine torque may be measured directly.

Moreover, in place of the angle detection device of the crankshaft and the engine torque estimation device, a cylinder pressure sensor may be added and the engine torque may be determined from the measured pressure.

Alternatively, in place of the crank angle detection device, a crank angle estimation device that estimates the crank angle using an angle sensor of the electric motor and a cam position sensor signal of the engine may be used to estimate the crank angle and used to estimate the engine torque.

Next, a third embodiment of the invention will be described. It should be noted that the configuration of the present embodiment is the same as that of the preceding first embodiment and that description thereof will be omitted.

Next, the action of the present embodiment will be described.

At the time of starting the engine, the MG1 functions as a cell motor and cranks the engine. When the fuel is injected and firing is initiated after the engine has reached a predetermined rotational frequency, the torque that the engine outputs rapidly increases. Also, because combustion is not stable immediately after the engine has completely exploded, there are cases where a torque that is dramatically larger than the target torque is outputted and the torque rapidly changes. Here, "complete explosion" refers to the engine initiating running by its own power. As a result, there have been times when vehicle vibration is generated in accompaniment with the sudden increase in the torque and fluctuations in the torque. Such vibration has often been generated particularly in cases where the capacity of the storage battery is sufficient while the vehicle is stopped, generation is not conducted by the MG1 at the time of starting the engine and the engine idles. This is thought to be caused by the following.

In a case where the vehicle is running or the engine is started because of a power demand and the MG1 generates power after the engine has been started, because the torque that has rapidly increased after the engine has autonomously begun running is absorbed by the MG1 as power, there are few times when the resilient constituents of the vehicle are caused to vibrate.

When it is not necessary for the MG1 to generate power after the engine has started, the target output of the engine after complete explosion is set to 0(idling) and, as a result, the MG1 torque command value is set to 0. However, although it is conceivable for the actual engine output to have a certain value that is not 0 at the time of transition immediately after complete explosion of the engine and gradually converge to a state of 0 output, it is thought that torque fluctuations accompanying unstable combustion and the sudden increase in the engine torque in that transition state are not absorbed by the MG1 and trigger vibration in the resilient constituents (torsional damper, drive shaft, etc.) of the drive system.

Figure 11:
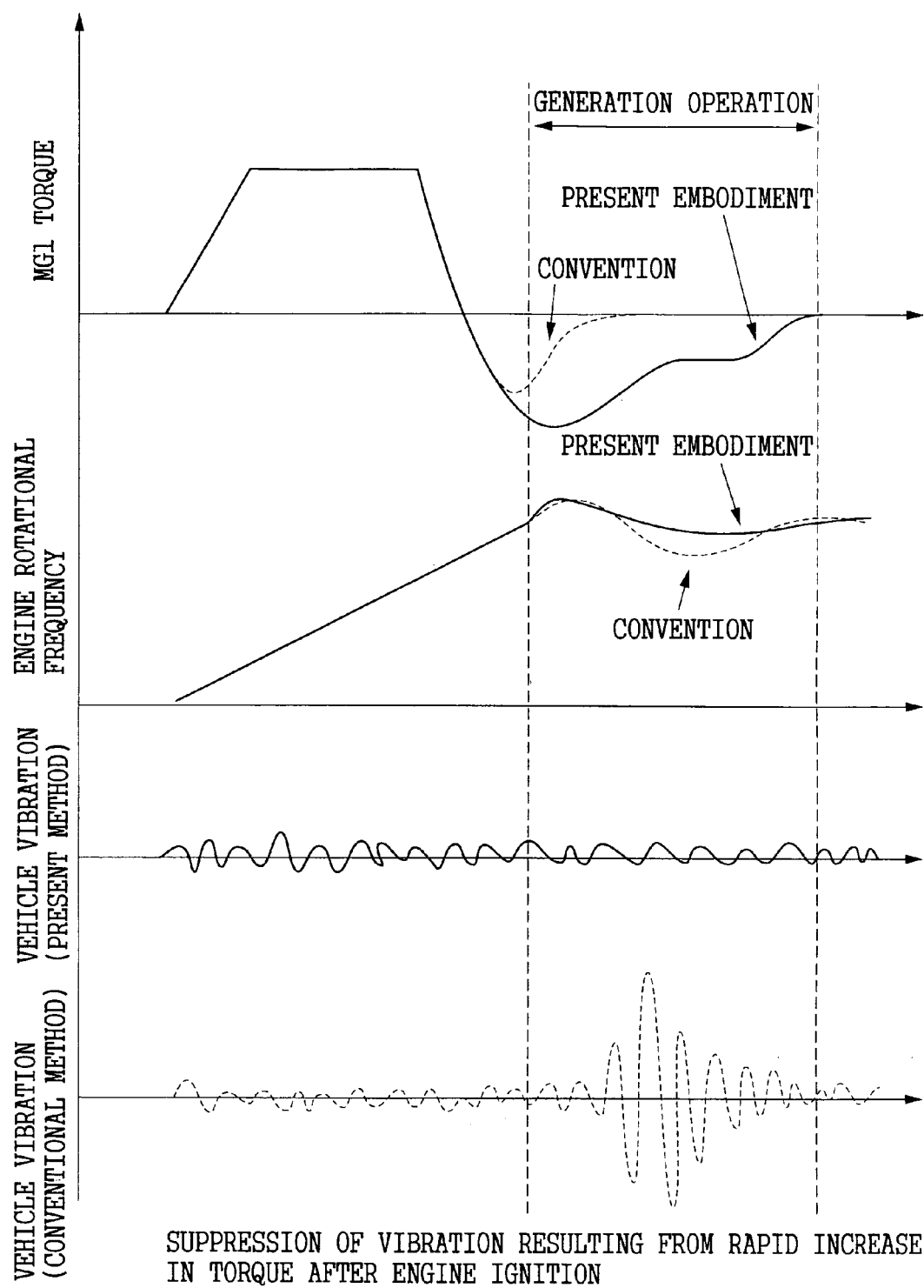
FIG. 11 is diagram showing control of vibration resulting from a sudden increase in torque after engine ignition.

In FIG. 11, a schematic diagram of control that dampens vibration resulting from torque fluctuations and a sudden increase in torque after complete explosion of the engine is shown and the present embodiment is compared with convention. When an engine starting demand is outputted for reasons such as the engine water temperature dropping while the vehicle is stopped, engine cranking is initiated by the MG1. Detailed description of the starting method of the engine in the hybrid vehicle will be omitted. When the rotational frequency of the engine reaches a predetermined rotational frequency, the engine initiates fuel injection control and ignition period control, and combustion is initiated when the fuel is ignited. Conventionally, when the engine begins running by its own power and complete explosion is determined, the MG1 concludes the engine starting operation and returns to ordinary control. In the ordinary control of the MG1, there is no need for power generation by the MG1 for reasons such as the charge amount of the battery being sufficient. However, when the engine cannot be stopped due to other reasons (drop in the engine water temperature, etc.), the engine changes to idling and the torque designated value of the MG1 is set to 0. Here, "idling" refers to a state where the engine output is substantially 0. Conventionally, because the MG1 torque is set to 0, the sudden increase in torque immediately after complete explosion of the engine has not been absorbed and vehicle vibration accompanying this has been generated.

In the present embodiment, a predetermined period after complete explosion of the engine has been confirmed at the time of starting the engine is made into a state where the MG1 is made to initiate the generating operation and a load is given to the engine even in a case where there is no demand for the generating operation by the MG1. This generating operation is performed for a period until engine combustion becomes stable, there is no potential for the engine torque to suddenly change and vibration is no longer generated, and control of the motor generator is returned to ordinary control after this period has elapsed. That is, because the engine idles as long as the battery capacity is sufficient and the generation demand is not generated, the torque command value of the motor generator is set to 0. By conducting this control, vehicle vibration generated as a result of torque fluctuations generated by unstable combustion and a sudden increase in torque after autonomous running initiation of the engine can be suppressed.

The amount of the MG1 torque at the time of the generating operation for vibration suppression after complete explosion is experimentally determined and set to become a small value of an extent where vibration is suppressed and running of the engine does not become unstable. Also, the period during which this generating operation is performed is similarly experimentally determined and set. In the hybrid vehicle of the example, when the engine conducts a load operation, the throttle and fuel injection amount are controlled so that the engine outputs a target output, and the engine rotational frequency is feedback-controlled by the MG1. Thus, a target output command correction value ΔPev of the engine is experimentally determined so that the torque of the MG1 becomes the above-described appropriate value, and this value is used as a final engine target output Pe*.

Figure 12:
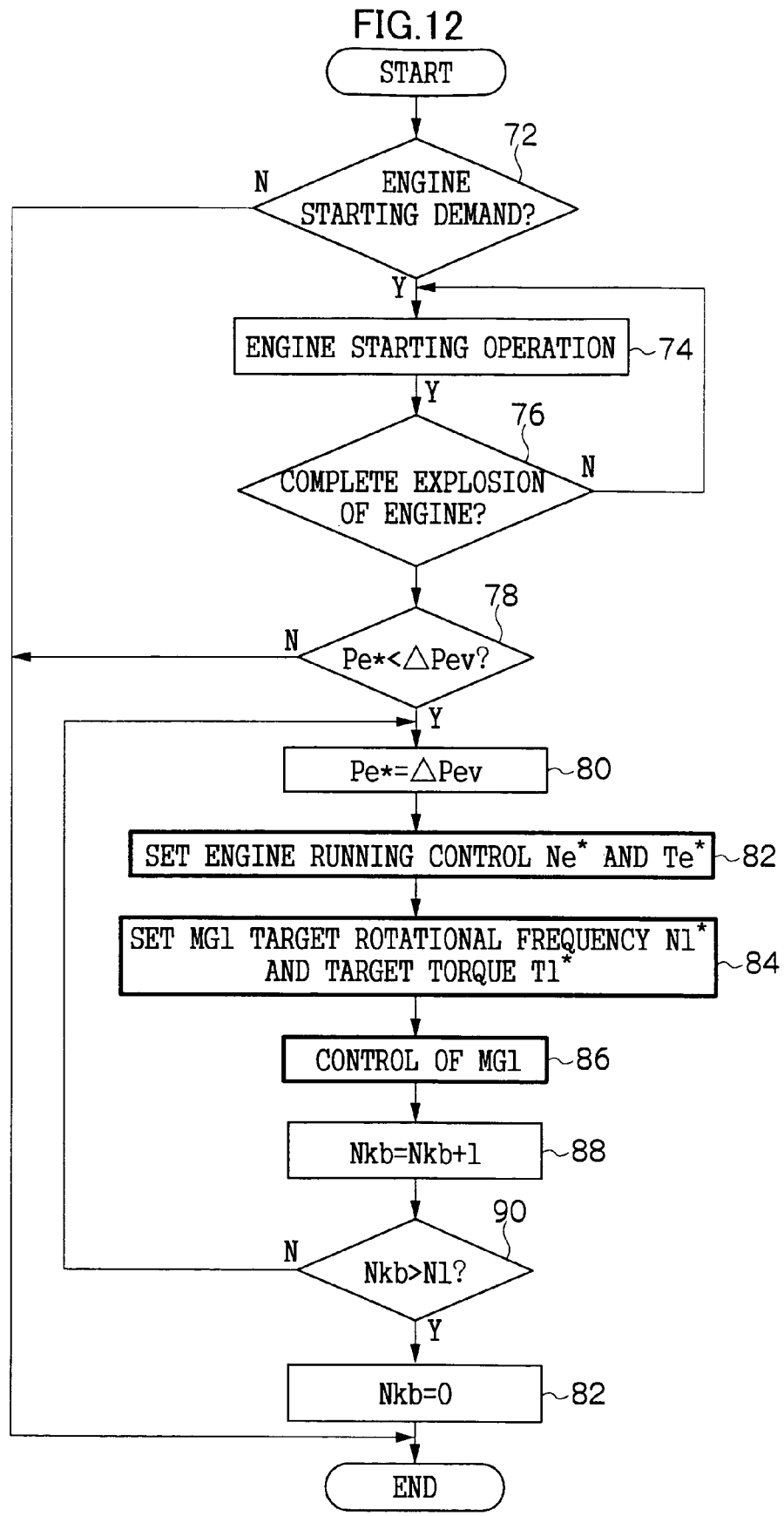
FIG. 12 is a flow chart showing a control routine implemented by a control unit pertaining to a third embodiment.

The above will be described as the action of the present embodiment with reference to the flow chart shown in FIG. 12.

When it is determined in step 72 that the starting demand of the engine is sent, the starting operation of the engine is implemented in step 74 and it is determined in step 76 that the engine has completely exploded, it is determined in step 78 whether or not the engine target output set value Pe* is smaller than ΔPev.

When the engine target output set value Pe* is smaller than the target output command correction value ΔPev of the engine, the engine target output set value Pe* is set as the final engine target output Pe* in step 80. That is, the lower limit of the engine target output is made the target output command correction value ΔPev of the engine in the predetermined period immediately after complete explosion.

In step 82, an engine target rotational frequency Ne* is set by referencing a target rotational frequency table on the basis of the engine target output. The target rotational frequency table is a map showing an efficient engine rotational frequency for outputting the engine target output. Moreover, an engine target torque Te* is set from the engine target rotational frequency Ne*.

In step 84, an MG1 torque command value Tmg1* is calculated from the feedback-control rule based on the deviation between the engine target rotational frequency Ne* and an engine actual rotational frequency Ne. That is, the target rotational frequency N1* of the MG1 and the target torque T1* of the MG1 are set. In step 86, the MG1 is controlled in accordance with the target rotational frequency N1* of the MG1 and the target torque T1* of the MG1.

As described above, the engine is run by the output ΔPev, and the MG1 conducts the generating operation in accompaniment therewith so as to absorb torque fluctuations and the sudden increase in torque after complete explosion. After complete explosion, the engine output correction is continued while an elapse counter Nkb is equal to or less than N1 (step 88, step 90N).

When it is determined in step 90 that Nkb has reached N1, lower limit processing of the engine target output is stopped in step 92. The value of N1 can be experimentally determined as a period until there are no longer effects of unstable combustion and the sudden increase in torque after complete explosion of the engine.

In the above-described third embodiment, after starting of the engine, the generator is controlled so that it generates power by the torque from the engine, even when it is not necessary to cause the storage battery to store. Thus, even if torque fluctuations are generated in the torque of the engine after the starting of the engine, the torque fluctuations can be absorbed by the generator via the power dividing mechanism, and torque fluctuations immediately after the starting of the engine can be easily reduced.

What is claimed is:

1. A torque transmission device comprising:
a transmission mechanism where a motor generator and an internal combustion engine are coupled and that acts by a torque of the motor generator so that a torque from the internal combustion engine is transmitted to a drive shaft;
a detector that detects torque pulsations generated in the torque from the internal combustion engine before the torque pulsations are transmitted to the drive shaft; and
a control unit that controls the motor generator to generate a reducing torque of the same phase as the torque pulsations for reducing effects of the detected torque pulsations on the drive shaft,
wherein the reducing torque is a value where the torque pulsations detected by the detector are multiplied by a constant determined from two physical quantities representing rotational properties of the motor generator and the internal combustion engine and a physical quantity representing a transmission property of the transmission mechanism.

2. A torque transmission device comprising:
a transmission mechanism where a motor generator and an internal combustion engine are coupled and that acts by a torque of the motor generator so that a torque from the internal combustion engine is transmitted to a drive shaft;
a detector that detects torque pulsations generated in the torque from the internal combustion engine before the torque pulsations are transmitted to the drive shaft; and
a control unit that controls the motor generator to generate a reducing torque of the same phase as the torque pulsations for reducing effects of the detected torque pulsations on the drive shaft,
wherein the relative amount of the reducing torque with respect to the torque pulsations is, outside of a predetermined time period including a time when the effects of the torque pulsations on the drive shaft become largest, smaller than that during the predetermined time period.

3. A torque transmission device comprising:
a transmission mechanism where a motor generator and an internal combustion engine are coupled and that acts by a torque of the motor generator so that a torque from the internal combustion engine is transmitted to a drive shaft;
a detector that detects torque pulsations generated in the torque from the internal combustion engine before the torque pulsations are transmitted to the drive shaft; and
a control unit that controls the motor generator to generate a reducing torque of the same phase as the torque pulsations for reducing effects of the detected torque pulsations on the drive shaft,
wherein the transmission mechanism includes
a first rotating shaft that receives the torque from the internal combustion engine,
a second rotating shaft coupled to the drive shaft, and
a third rotating shaft that is coupled to the motor generator and acts by the torque from the motor generator so that the torque received by the first rotating shaft is transmitted to the drive shaft via the second rotating shaft.

4. The torque transmission device of claim 3, further including a resilient buffer mechanism coupled between the internal combustion engine and the first rotating shaft.

5. The torque transmission device of claim 3, wherein a reducer is coupled to the drive shaft.

6. A method of reducing effects of torque pulsations where effects on a drive shaft of torque pulsations generated in a torque from an internal combustion engine when the torque from the internal combustion engine is transmitted to the drive shaft are reduced by a torque from a motor generator, the method comprising the steps of:
detecting the torque generated in the torque from the internal combustion engine before the torque from the internal combustion engine is transmitted to the drive shaft; and
controlling the motor generator to generate a reducing torque of the same phase as the torque pulsations for reducing effects of the detected torque pulsations on the drive shaft,
wherein the reducing torque is a value where the torque pulsations detected by the detecting step are multiplied by a constant determined from two physical quantities representing rotational properties of the motor generator and the internal combustion engine and a physical quantity representing a transmission property of the transmission mechanism.

7. A method of reducing effects of torque pulsations where effects on a drive shaft of torque pulsations generated in a torque from an internal combustion engine when the torque from the internal combustion engine is transmitted to the drive shaft are reduced by a torque from a motor generator, the method comprising the steps of:
detecting the torque generated in the torque from the internal combustion engine before the torque from the internal combustion engine is transmitted to the drive shaft; and
controlling the motor generator to generate a reducing torque of the same phase as the torque pulsations for reducing effects of the detected torque pulsations on the drive shaft,
wherein the relative amount of the reducing torque with respect to the torque pulsations is, outside of a predetermined time period including a time when the effects of the torque pulsations on the drive shaft become largest, smaller than that during the predetermined time period.

8. A torque transmission device comprising:
a transmission mechanism where an electric motor and an internal combustion engine are coupled and that acts by a torque of the electric motor so that a torque from the internal combustion engine is transmitted to a drive shaft;
a detector that detects torque pulsations generated in the torque from the internal combustion engine before the torque pulsations are transmitted to the drive shaft; and
a control unit that controls the electric motor to generate a reducing torque of the same phase as the torque pulsations for reducing effects of the detected torque pulsations on the drive shaft,
wherein the reducing torque is a value where the torque pulsations detected by the detector are multiplied by a constant determined from two physical quantities representing rotational properties of the electric motor and the internal combustion engine and a physical quantity representing a transmission property of the transmission mechanism.

9. A torque transmission device comprising:
a transmission mechanism where an electric motor and an internal combustion engine are coupled and that acts by a torque of the electric motor so that a torque from the internal combustion engine is transmitted to a drive shaft;
a detector that detects torque pulsations generated in the torque from the internal combustion engine before the torque pulsations are transmitted to the drive shaft; and
a control unit that controls the electric motor to generate a reducing torque of the same phase as the torque pulsations for reducing effects of the detected torque pulsations on the drive shaft,
wherein the relative amount of the reducing torque with respect to the torque pulsations is, outside of a predetermined time period including a time when the effects of the torque pulsations on the drive shaft become largest, smaller than that during the predetermined time period.

10. A torque transmission device comprising:
a transmission mechanism where an electric motor and an internal combustion engine are coupled and that acts by a torque of the electric motor so that a torque from the internal combustion engine is transmitted to a drive shaft;
a detector that detects torque pulsations generated in the torque from the internal combustion engine before the torque pulsations are transmitted to the drive shaft; and
a control unit that controls the electric motor to generate a reducing torque of the same phase as the torque pulsations for reducing effects of the detected torque pulsations on the drive shaft,
wherein the transmission mechanism includes
a first rotating shaft that receives the torque from the internal combustion engine,
a second rotating shaft coupled to the drive shaft, and
a third rotating shaft that is coupled to the electric motor and acts by the torque from the electric motor so that the torque received by the first rotating shaft is transmitted to the drive shaft via the second rotating shaft.

11. The torque transmission device of claim 10, further including a resilient buffer mechanism coupled between the internal combustion engine and the first rotating shaft.

12. The torque transmission device of claim 10, wherein a reducer is coupled to the drive shaft.

* * * * *